US008934478B2

(12) United States Patent
Rahman et al.

(10) Patent No.: US 8,934,478 B2
(45) Date of Patent: Jan. 13, 2015

(54) MANAGING TELEPHONY SERVICES USING MULTIPLE USERS WITHIN A TELEPHONY CONTROL POINT IN A HOME NETWORK

(75) Inventors: Mahfuzur Rahman, Santa Clara, CA (US); Alan Messer, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 428 days.

(21) Appl. No.: 13/092,727

(22) Filed: Apr. 22, 2011

(65) Prior Publication Data

US 2012/0189000 A1  Jul. 26, 2012

Related U.S. Application Data

(60) Provisional application No. 61/435,228, filed on Jan. 21, 2011.

(51) Int. Cl.
  *H04L 12/66* (2006.01)
  *H04L 29/06* (2006.01)
  *H04M 3/42* (2006.01)

(52) U.S. Cl.
  CPC .............. *H04L 63/08* (2013.01); *H04L 63/102* (2013.01); *H04M 3/42238* (2013.01); *H04L 65/1073* (2013.01); *H04L 65/1026* (2013.01); *H04L 65/1036* (2013.01)
  USPC ............................................. 370/352; 726/1

(58) Field of Classification Search
  USPC ............................................. 370/352; 726/1
  See application file for complete search history.

(56) References Cited

U.S. PATENT DOCUMENTS

| 7,499,535 | B1 * | 3/2009 | Ivory et al. | 379/202.01 |
| 2005/0135391 | A1 * | 6/2005 | Sung | 370/401 |
| 2005/0213609 | A1 * | 9/2005 | Brusilovsky et al. | 370/474 |
| 2006/0123116 | A1 * | 6/2006 | Rahman et al. | 709/227 |
| 2006/0234693 | A1 * | 10/2006 | Isidore et al. | 455/422.1 |
| 2006/0239190 | A1 * | 10/2006 | Kumar et al. | 370/230 |
| 2006/0264234 | A1 * | 11/2006 | Akama | 455/556.1 |
| 2009/0300158 | A1 * | 12/2009 | Bobde et al. | 709/223 |
| 2010/0323721 | A1 * | 12/2010 | Akama | 455/456.1 |
| 2011/0110271 | A1 * | 5/2011 | Arauz-Rosado | 370/255 |

* cited by examiner

*Primary Examiner* — Nicholas Jensen
(74) *Attorney, Agent, or Firm* — Kenneth L. Sherman, Esq.; Michael Zarrabian, Esq.; Sherman & Zarrabian LLP

(57) ABSTRACT

A method for operating a telephony server in a home network is provided, comprising: receiving a first registration action from a first telephony control point in the home network, the first registration action including an identification of a first user within a first telephony control point; supplying a first authentication identifier to the first telephony control point, wherein the first authentication identifier is bound to both the first telephony control point and the first user; receiving an invoked action granting a telephony action from the first telephony control point, wherein the invoked action includes an authentication identifier; determining if the authentication identifier received in the invoked action matches the authentication identifier bound to the user which the telephony action involves; and executing the telephony action if the authentication information received in the invoked action matches the authentication identifier bound to the user which the telephony action involves.

20 Claims, 4 Drawing Sheets

MANAGING TELEPHONY SERVICES USING MULTIPLE USERS WITHIN A TELEPHONY CONTROL POINT IN A HOME NETWORK

CROSS-REFERENCE TO RELATED APPLICATIONS

This application claims the benefit of priority under 35 U.S.C. 119(e) to U.S. Provisional Patent Application No. 61/435,228, filed Jan. 21, 2011, which is incorporated herein by reference for all purposes.

BACKGROUND OF THE INVENTION

1. Field of the Invention

The present invention relates generally to home networking. More specifically, the present invention relates to managing telephony services using multiple users within a telephony control point in a home network.

2. Description of the Related Art

Home networking has advanced from the early days of merely linking computers and printer to the modern home network, which can include mobile devices, televisions, set-top boxes, refrigerators, etc.

Universal Plug and Play (UPnP) is a distributed, open networking architecture that allows devices to connect seamlessly and to simplify the implementation of networks in the home (data sharing, communications, and entertainment) and corporate environments. UPnP achieves this by defining and publishing UPnP device control protocols built upon open, Internet-based communication standards.

UPnP has grown in popularity of late in part due to the rise in popularity of media servers. Media servers are small computers that store multiple types of content (e.g., photos, music, videos, etc.). The content may then be streamed from a media server to one or more control points (e.g., iPod, television set, etc.).

Voice over Internet Protocol (VoIP) is a general term for a family of transmission technologies for delivery of voice communications over the Internet or other packet-switched networks. Other terms frequently encountered and synonymous with VoIP are IP telephony and Internet telephony, as well as voice over broadband, broadband telephony, and broadband phone, when the network connectivity is available over broadband Internet access.

VoIP systems usually interface with the traditional public switched telephone network (PSTN) to allow for transparent phone communications worldwide.

VoIP can be a benefit for reducing communication and infrastructure costs by routing phone calls over existing data networks and avoiding duplicate network systems. Skype™ and Vonage™ are notable service provider examples that have achieved widespread user and customer acceptance and market penetration.

Voice-over-IP systems carry telephony speech as digital audio, typically reduced in data rate using speech data compression techniques, packetized in small units of typically tens of milliseconds of speech, and encapsulated in a packet stream over IP.

The Session Initiation Protocol (SIP) is a VoIP signaling protocol, widely used for setting up and tearing down multimedia communication sessions such as voice and video calls over the Internet. The protocol can be used for creating, modifying and terminating two-party (unicast) or multiparty (multicast) sessions consisting of one or several media streams. The modification can involve changing addresses or ports, inviting more participants, adding or deleting media streams, etc.

SIP clients typically use TCP or UDP (typically on port 5060 and/or 5061) to connect to SIP servers and other SIP endpoints. SIP is primarily used in setting up and tearing down voice or video calls.

A motivating goal for SIP was to provide a signaling and call setup protocol for IP-based communications that can support a superset of the call processing functions and features present in the public switched telephone network (PSTN). SIP by itself does not define these features; rather, its focus is call-setup and signaling. However, it was designed to enable the construction of functionalities of network elements designated Proxy Servers and User Agents. These are features that permit familiar telephone-like operations: dialing a number, causing a phone to ring, hearing ringback tones or a busy signal. Implementation and terminology are different in the SIP world but to the end-user, the behavior is similar.

SIP-enabled telephony networks can also implement many of the more advanced call processing features present in Signaling System 7 (SS7), though the two protocols themselves are very different. SS7 is a centralized protocol, characterized by a complex central network architecture and dumb endpoints (traditional telephone handsets). SIP is a peer-to-peer protocol, thus it requires only a simple (and thus scalable) core network with intelligence distributed to the network edge, embedded in endpoints (terminating devices built in either hardware or software). SIP features are implemented in the communicating endpoints (i.e. at the edge of the network) contrary to traditional SS7 features, which are implemented in the network.

Recently, VoIP has been extended to mobile devices such as cellular phones. There are several methodologies by which a mobile handset can be integrated into a VoIP network. One implementation turns the mobile device into a standard SIP client, which then uses a data network to send and receive SIP messaging, and to send and receive RTP for the voice path. This methodology of turning a mobile handset into a standard SIP client requires that the mobile handset support, at minimum, high speed IP communications. In this application, standard VoIP protocols (typically SIP) can be used over any broadband IP-capable wireless network connection.

As UPnP grows in popularity, more and more devices in the home are going to be networked. If these devices all have the capability to perform various telephony-related tasks through the UPnP protocol, then it is desirable to make the telephony aspects of these devices as easy to use as possible. Additionally, while traditional telephones were typically only used by a single user (or at least, only a single user at a time), many UPnP devices may be more communal-type devices, such as televisions and refrigerators, where it is more likely there may be more than one user operating the device at any one time. For example, a phone call may arrive for Dad at a UPnP television, but Dad is watching the television with Mom and the kids as well. Indeed, with the presence of multiple UPnP devices in a home network, it may be that Dad is closest to one device while Mom is closest to another. It would be beneficial if there was a way to extend telephony services so that it is tied to individual users such that a call or request for presence information would be directed only to the most appropriate UPnP device. The current UPnP standard only permits tying telephony services to control points, not users.

SUMMARY OF THE INVENTION

In a first embodiment of the present invention, a method for operating a telephony server in a home network is provided, the method comprising: receiving a first registration action from a first telephony control point in the home network, the first registration action including an identification of a first user within a first telephony control point; supplying a first authentication identifier to the first telephony control point, wherein the first authentication identifier is bound to both the first telephony control point and the first user; receiving a second registration action from the first telephony control point in the home network, the second registration action including an identification of a second user within the first telephony control point; supplying a second authentication identifier to the first telephony control point, wherein the second authentication identifier is bound to both the first telephony control point and the second user; initiating a telephony action, wherein the telephony action involves either the first user or the second user; determining which user the telephony action involves; sending a notification to the user which the telephony action involves; receiving an invoked action granting the telephony action from the first telephony control point, wherein the invoked action includes an authentication identifier; determining if the authentication identifier received in the invoked action matches the authentication identifier bound to the user which the telephony action involves; and executing the telephony action if the authentication information received in the invoked action matches the authentication identifier bound to the user which the telephony action involves.

In a second embodiment of the present invention, a method for operating a telephony control point in a home network is provided, the method comprising: registering a user of the telephony control point with a telephony server by sending a registration action including an identification of the user to the telephony server; receiving an authentication identifier from the telephony server in response to the registration; storing the authentication identifier in a mapping between users of the telephony control points and corresponding authentication identifiers; receiving a notification of a telephony event from the telephony server, wherein the notification includes an identification of a user to which the telephony event pertains; retrieving an authentication identifier corresponding to the user to which the telephony event pertains from the stored mapping; invoking an action on the telephony server to execute the telephony event, wherein the invocation of the action includes the authentication identifier corresponding to the user to which the telephony event pertains retrieved from the stored mapping.

In a third embodiment of the present invention, a telephony server operating in a home network is provided, comprising: means for receiving a first registration action from a first telephony control point in the home network, the first registration action including an identification of a first user within a first telephony control point; means for supplying a first authentication identifier to the first telephony control point, wherein the first authentication identifier is bound to both the first telephony control point and the first user; means for receiving a second registration action from the first telephony control point in the home network, the second registration action including an identification of a second user within the first telephony control point; means for supplying a second authentication identifier to the first telephony control point, wherein the second authentication identifier is bound to both the first telephony control point and the second user; means for initiating a telephony action, wherein the telephony action involves either the first user or the second user; means for determining which user the telephony action involves; means for sending a notification to the user which the telephony action involves; means for receiving an invoked action granting the telephony action from the first telephony control point, wherein the invoked action includes an authentication identifier; means for determining if the authentication identifier received in the invoked action matches the authentication identifier bound to the user which the telephony action involves; and means for executing the telephony action if the authentication information received in the invoked action matches the authentication identifier bound to the user which the telephony action involves.

In a fourth embodiment of the present invention, a home network system is provided comprising: one or more telephony control points; a first telephony server; and a second telephony server; wherein each of the one or more telephony control points is designed to, for each user, register with one or more of the telephony servers, and wherein at least one of the telephony control points registers with both the first telephony server and the second telephony server for at least one user; wherein each telephony server is designed to: in response to a registration from a particular telephony control point for a particular user, generate and send an authentication identifier corresponding to the particular telephony control point and the particular user to the particular telephony control point; upon receipt of an invocation of an action from the particular control point for the particular user, only executing the action if an authentication identifier included in the invocation of the action matches the authentication identifier sent in response to the registration from the particular telephony control point for the particular user.

In a fifth embodiment of the present invention, a non-transitory program storage device readable by a machine tangibly embodying a program of instructions executable by the machine to perform a method for operating a telephony server in a home network, the method comprising: receiving a first registration action from a first telephony control point in the home network, the first registration action including an identification of a first user within a first telephony control point; supplying a first authentication identifier to the first telephony control point, wherein the first authentication identifier is bound to both the first telephony control point and the first user; receiving a second registration action from the first telephony control point in the home network, the second registration action including an identification of a second user within the first telephony control point; supplying a second authentication identifier to the first telephony control point, wherein the second authentication identifier is bound to both the first telephony control point and the second user; initiating a telephony action, wherein the telephony action involves either the first user or the second user; determining which user the telephony action involves; and sending a notification to the user which the telephony action involves; receiving an invoked action granting the telephony action from the first telephony control point, wherein the invoked action includes an authentication identifier; determining if the authentication identifier received in the invoked action matches the authentication identifier bound to the user which the telephony action involves; and executing the telephony action if the authentication information received in the invoked action matches the authentication identifier bound to the user which the telephony action involves.

DETAILED DESCRIPTION OF SPECIFIC EMBODIMENTS

Figure 1:
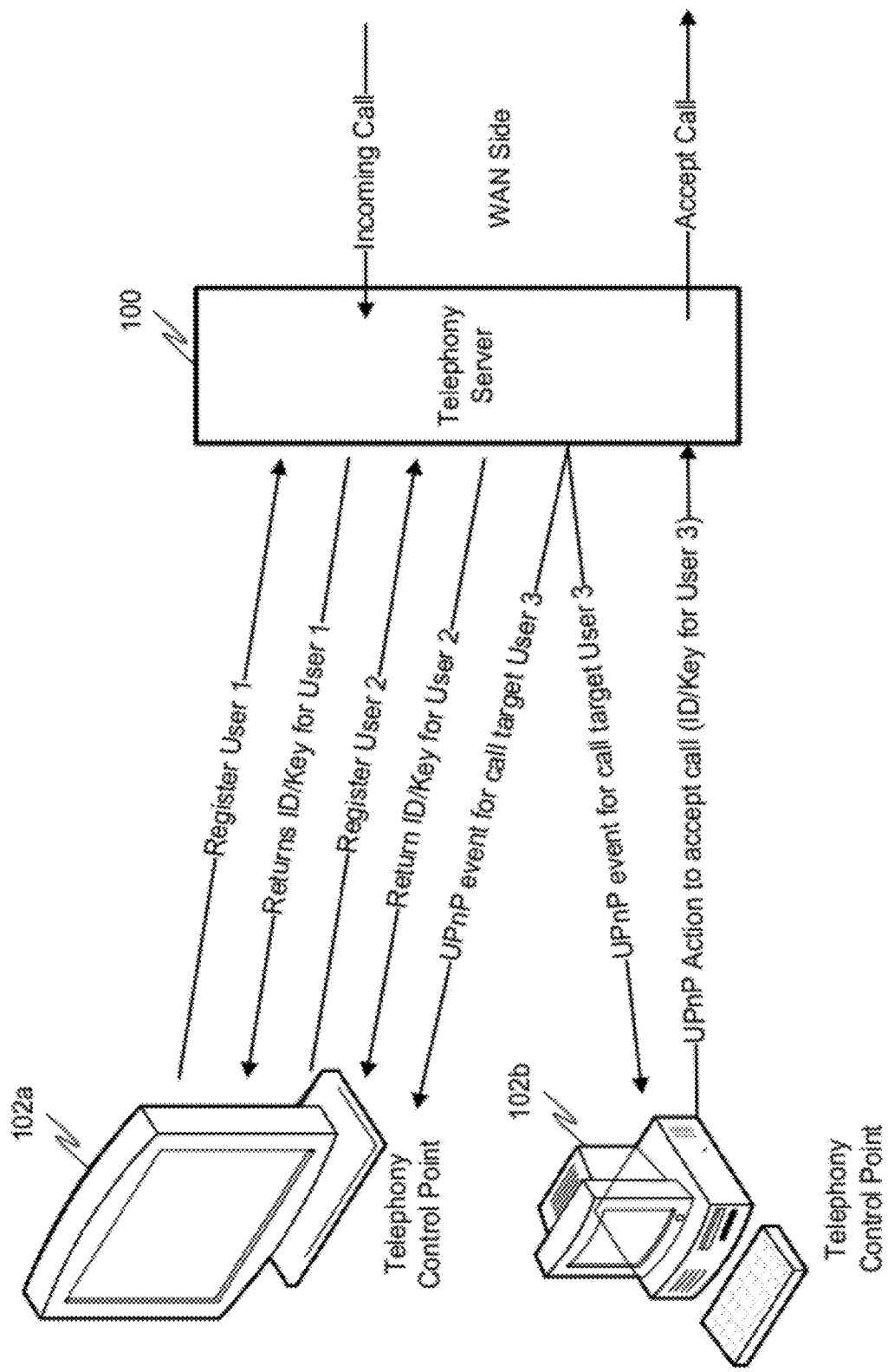
FIG. 1 is a block diagram illustrating a system for providing multi-user access to telephony services in a home network in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

An embodiment of the present invention allows multiple users to be tied to a telephony control point. A request for accessibility or authorization of presence information of a telephony service can then be determined by devices in the UPnP network. This allows for a number of different scenarios. In a first scenario, multiple users can be tied to a UPnP telephone control point and telephony calls can be directed to a specific user within a specific control point. For example, an incoming call for Joe on the living room television can be directed specifically to the living room television and only answerable by Joe. It should be noted, however, that the present invention can be applied to other telephony services and aspects, such as presence information, messaging, voice mail, etc.

In a second scenario, users can be assigned to a specific home network device and to a specific telephone server (phone number). For example, Joe may be tied to a television while using a shared home number.

In a third scenario, the system can control the level of details of the incoming call or presence information. A control point is shared by multiple users, and the level of information for a call can be limited based on a user's policy. For example, only a few details can be exposed about a call when it is forwarded to a shared device, and those details can be retrieved by the user only by providing authentication information to the telephony server. Likewise, if the call is forwarded to a private device, all of the details can be exposed about the call. This provides some level of privacy for users when operating shared devices such as televisions.

In one embodiment of the present invention, the telephony sever provides a registration action for UPnP control points to register a user. This action may also allow the control point to set the policy for the user. For example, calls from a specific callee from the wide area network can be directed to a particular user. The registration action allows the control point to set a unique name for the user. The telephony server then can return a unique key for the user if the action succeeds. A control point can register multiple users, with each user having a different name and key.

It should be noted that it may be necessary, prior to these actions, for a user to log in or otherwise authenticate him or herself with the control point, using some login mechanism. This is a local authentication which then adds an additional level of security to the registration with the telephony server.

At this point, the telephony server can receive an incoming call (or an SMS or a presence request), it can send a notification message. By accessing its records of which user/control point combinations have registered, the telephony server can direct the incoming call to the precise control point it needs to and inform the control point that the incoming call is for the particular user. Depending upon the policy for the callee set in the server, this notification message may or may not include details of the call. The notification may also contain the name of the user for whom the call is directed.

Control points monitor for UPnP telephony server events. If a control point recognizes a user identifier in the notification message from a previous registration, the control point can respond with an action to obtain call information from the telephony server. The control point where the user is located can invoke the action by providing the key/id of the user. These actions may optionally be sent over a UPnP Secure session with the telephony server to protect inbound call information or presence information transmitted on the home network from being intercepted or modified.

It should be noted that the term "home networking" as used throughout this document refers to a type of network that is commonly used in homes to connect media devices. There is no requirement, however, that this type of networking actually be used in homes, as it has equal applicability for use in businesses or other entities. As such, the term "home networking" shall not be construed as limiting any embodiments of the present invention to use in a home, and shall be interpreted as any type of local area network (LAN).

Presence information regarding users that are operating outside of a home network can be made available to users inside the home network via a presence server. The presence server may be a software element that can be part of a UPnP telephony server (i.e., a telephony server with presence capabilities). A telephony server is a home networking server that acts as a central point for incoming (and possibly outgoing) telephone calls. Typically, each telephony server will represent a single phone number that can be shared among multiple devices in the home network (and multiple users as well). Typically, a separate phone number will be referred to as a separate telephony server, although from an architecture standpoint both "servers" may reside on a single device.

A telephony server typically has a Uniform Resource Identifier (URI) or similar mechanism for identifying its location. In SIP environments, this may be a SIP URI. This URI can be used either alone, to reference all users of the telephony server, or may be appended to a user name to identify an individual user of the telephone line.

FIG. 1 is a block diagram illustrating a system for providing multi-user access to telephony services in a home network in accordance with an embodiment of the present invention. Here, a telephony server 100 receives phone calls and sends out event notifications to various telephony control points 102a, 102b in the home network. Control point 102a may be television that is managing two users. Control point 102a registers both users with the telephony server 100. The telephony server 100 then returns a key for the user for each registration action. Each user can log on to the control point 102a using their user name and password.

The telephony server 100 can be configured locally for different users. The configuration may include, for example, setting up which calls will be controlled by which user and by which control point. When a telephony control point 102a, 102b receives an event for notification of an incoming call from the telephony server 100, the telephony control point 102a, 102b invokes an action on the telephony server 100 to accept or reject the call. When invoking the action to accept or reject, the telephony control point 102a, 102b also supplies the key associated with the user for whom the call is intended.

The telephony server 100 may then only accept the request from a telephony control point 102a, 102b that supplies the key associated with the user for whom the call is intended (and from a control point is in the list of authorized control points to invoke this action). The above process, as described earlier, can be used not only to manage calls, but also for other telephony services, such as delivering presence information, callerID, and voice mail services. It should be noted that while the term "key" may be used throughout this document, one of ordinary skill in the art will recognize that any type of authentication identifier may suffice.

It should be noted that FIG. 1 depicts telephony control points interacting with only one telephony server. Embodiments are possible, however, where the telephony control point can interact with multiple telephony servers. In that case, the users within the telephony control point can also be registered with multiple telephony servers, in the same way as registering with a single telephony server, as described above.

In one embodiment of the present invention, each user is identified by a combination of the telephony control point name and the user name as the name to register with the telephony server. This results in the ID being returned from the telephony server being bound to both the telephony control point and the user.

In order to provide additional security, a registration system may be implemented in certain embodiments of the present invention. A UPnP control point may register itself (bound to a particular user) with the telephony server. This registration may include the control point ID and the name of the user, and the telephony server may then issue a key or ID to the telephony control point. When the telephony control point attempts to communicate with the user for any purpose (e.g., incoming phone call, request for presence information, voice mail message notification), the body of the UPnP notification can include an indication of the user. The control point then may check a stored mapping between this indicated user and keys. If there is a match, then it invokes an action and supplies the corresponding stored key to the telephony server. The telephony server then verifies the key, and if it is valid, the telephony server accepts the action. The communications themselves can be encrypted to provide further security, and the action that is invoked by the telephony control point can return the password to decrypt the encrypted content.

Figure 2:
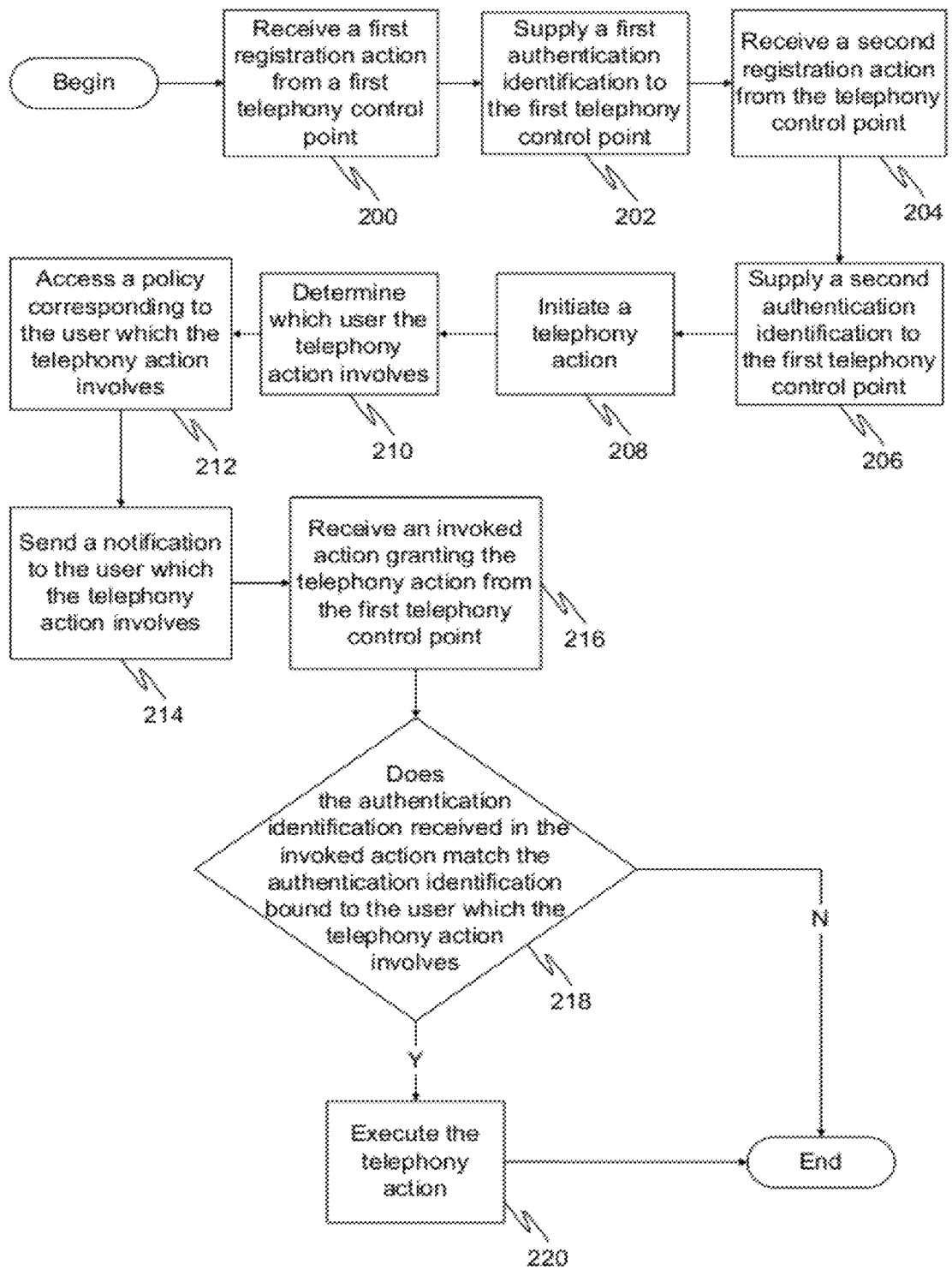
FIG. 2 is a flow diagram illustrating a method for operating a telephony server in a home network in accordance with an embodiment of the present invention.

FIG. 2 is a flow diagram illustrating a method for operating a telephony server in a home network in accordance with an embodiment of the present invention. At 200, a first registration action is received from a first telephony control point in the home network. This first registration action includes an identification of a first user. The registration essentially ties the first user to the telephony server, allowing the telephony server to alert the user of telephony events involving the user received at the telephony server. The user may either explicitly be requesting this registration, or the registration may be performed transparently to the user. It should be noted that in some embodiments this registration request may also include the name of the control point. However, this information is optional.

At 202, a first authentication identifier is supplied to the first telephony control point. This authentication identifier may be a unique identifier or key generated by the telephony server. The authentication identifier is bound to both the first telephony control point and the first user.

Later, at 204, a second registration action is received from the first telephony control point. This second registration action includes an identification of a second user different than the first user. At 206, a second authentication identifier is supplied to the first telephony control point. As with the first authentication identifier, the second authentication identifier may be a unique identifier or key generated by the telephony server, and is bound to both the first telephony control point and the second user. In this manner, two different users from the same telephony control point have registered with the telephony server.

At 208, a telephony action is initiated. This telephony action involves a user. In this example, it is assumed the telephony action involves one of the users registered with the telephony server. If that was not the case, then an alternative method could be performed. This alternative method might involve simply doing nothing with the telephony action (e.g., not answering an incoming call) or might involve a generic method for telephony actions not tied to registered users (e.g., a default routing of the incoming phone call to a "main" control point).

The telephony action can be any of a number of different home network telephony actions, including, for example, answering an incoming phone call, a request for presence information, or the playing of a newly recorded voice mail.

At 210, it is determined which user the telephony action involves. At 212, a policy corresponding to the user which the telephony action involves is accessed. At 214, a notification is sent to the user which the telephony action involves. The level of details provided in this notification may depend on the policy accessed for the user. This policy may, for example, indicate that only the name of the user which the telephony action involves and the type of the telephony action are contained in the notification. Alternatively, more details may be provided in the notification, such as an identification of the callee.

At 216, an invoked action granting the telephony action (e.g., "answer the phone call") is received from the first telephony control point. The invoked action includes an authentication identifier. At 218, it is determined if the authentication identifier received in the invoked action matches the authentication identifier bound to the user which the telephony action involves. At 220, the telephony action is executed if the authentication information received in the invoked action matches the authentication identifier bound to the user which the telephony action involves. What the system does in the case that the authentication identifier does not match can vary dramatically based on implementation. In the implementation of FIG. 2, nothing happens (the telephony event is essentially ignored). In other embodiments, however, an error message may be generated or other affirmative actions may take place.

Figure 3:
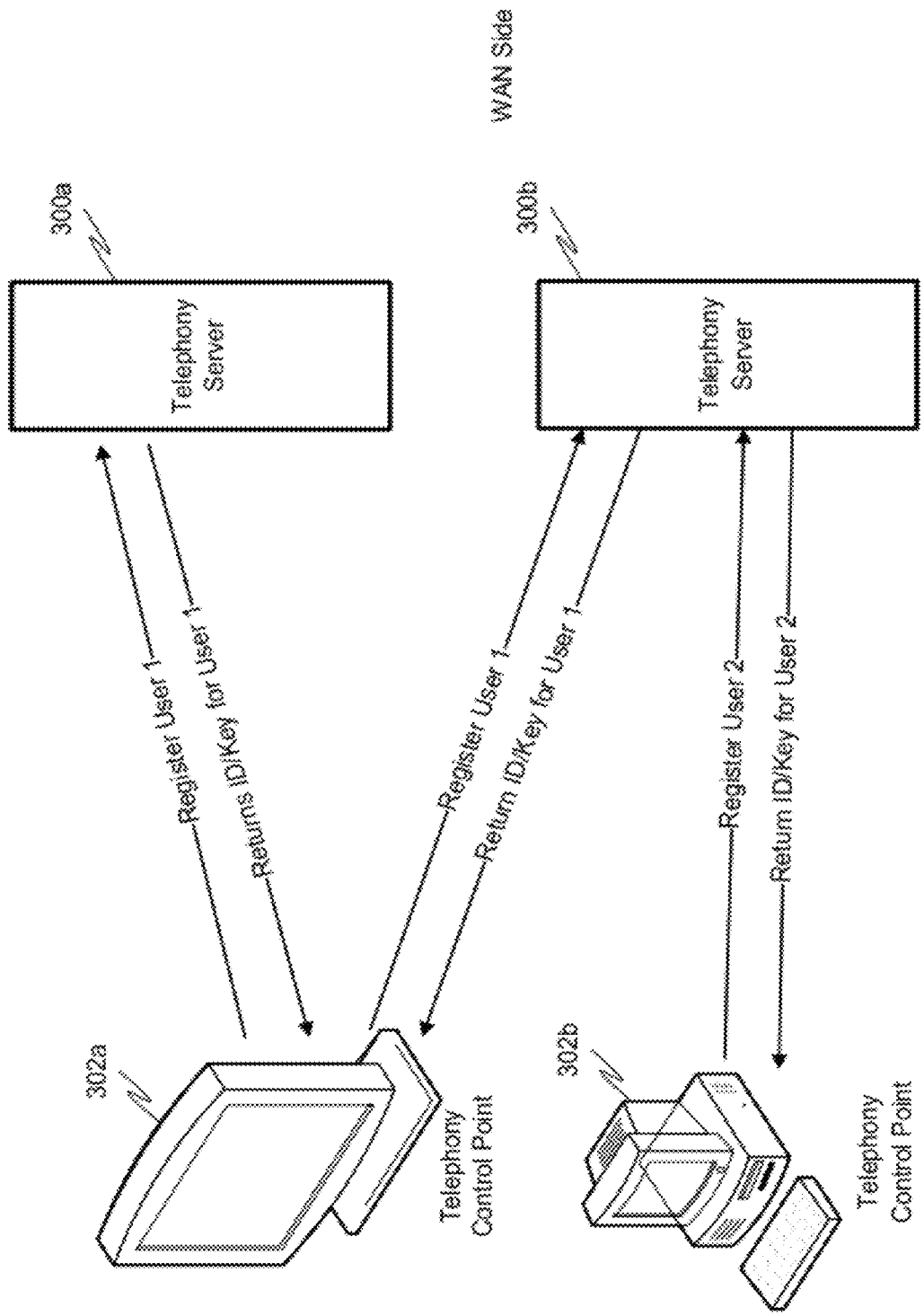
FIG. 3 is a block diagram illustrating a system for providing multi-user access to telephony services in a home network in accordance with another embodiment of the present invention.

FIG. 3 is a block diagram illustrating a system for providing multi-user access to telephony services in a home network in accordance with another embodiment of the present invention. In this embodiment, multiple telephony servers 300a, 300b are provided. At least one of the control points 302a, 302b (here, control point 302a) registers the same user with both telephony servers 300a, 300b. In this manner, a single user can be associated with and received notifications for multiple phone numbers. Indeed, there is no limit on the number of different user/control point/telephony server combinations that can be registered, providing a scalable and efficient system.

As will be appreciated to one of ordinary skill in the art, the aforementioned example architectures can be implemented in many ways, such as program instructions for execution by a processor, as software modules, microcode, as computer program product on computer readable media, as logic circuits, as application specific integrated circuits, as firmware, as consumer electronic device, etc. and may utilize wireless devices, wireless transmitters/receivers, and other portions of wireless networks. Furthermore, embodiment of the disclosed method and system for displaying multimedia content on multiple electronic display screens can take the form of an entirely hardware embodiment, an entirely software embodiment, or an embodiment containing both software and hardware elements.

Figure 4:
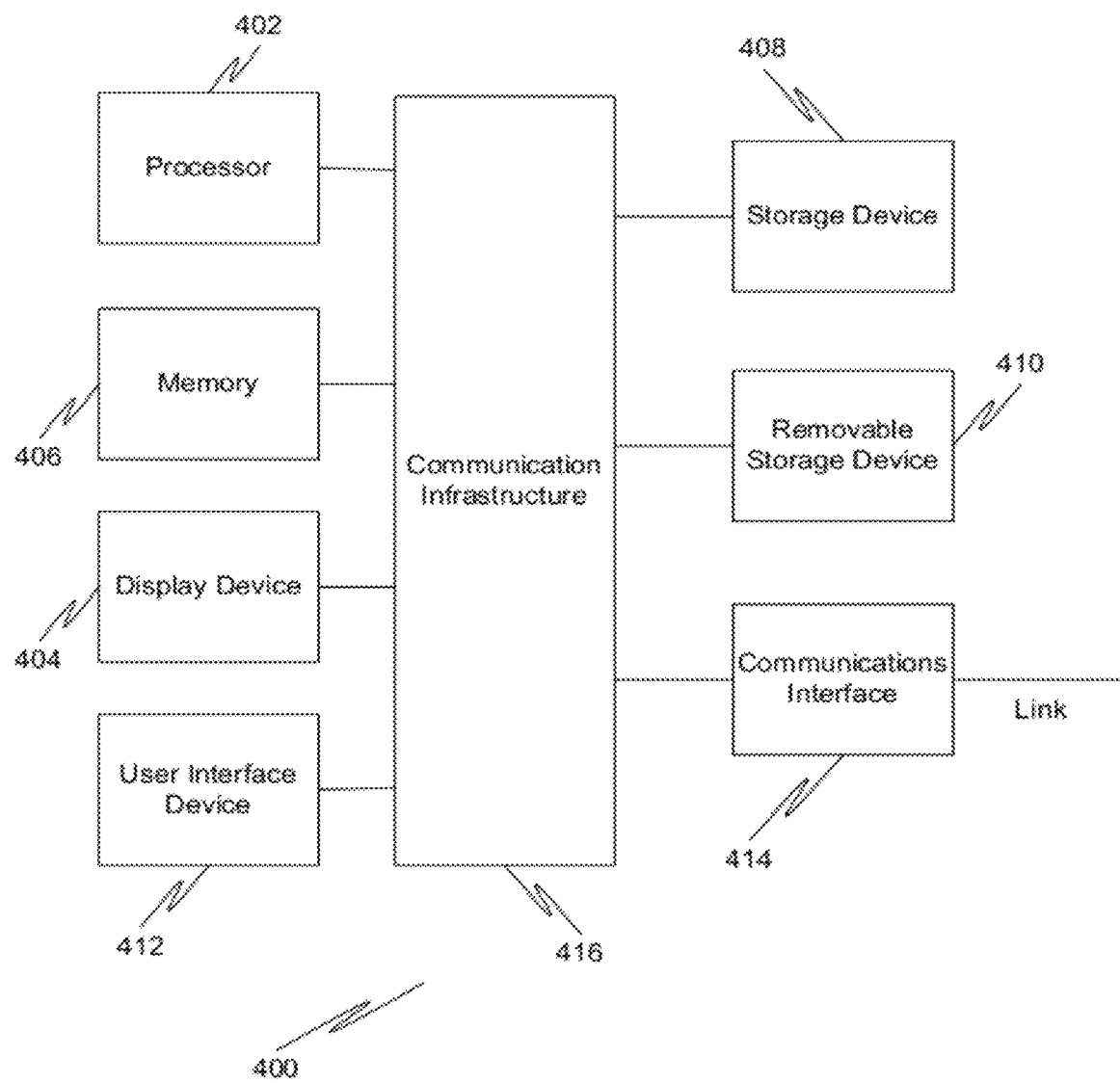
FIG. 4 is a high level block diagram showing a computer system in accordance with an embodiment of the present invention.

FIG. 4 is a high level block diagram showing a computer system in accordance with an embodiment of the present invention. The computer system 400 is useful for implementing an embodiment of the disclosed invention. The computer system 400 includes one or more processors 402, and further can include an electronic display device 404 (for displaying graphics, text, and other data), a main memory 406 (e.g., random access memory (RAM)), storage device 408 (e.g., hard disk drive), removable storage device 410 (e.g., optical disk drive), user interface devices 412 (e.g., keyboards, touch screens, keypads, mice or other pointing devices, etc.), and a communication interface 414 (e.g., wireless network interface). The communication interface 414 allows software and data to be transferred between the computer system 400 and external devices via a link. The system may also include a communications infrastructure 416 (e.g., a communications bus, cross-over bar, or network) to which the aforementioned devices/modules are connected.

Information transferred via communications interface 614 may be in the form of signals such as electronic, electromagnetic, optical, or other signals capable of being received by communications interface 614, via a communication link that carries signals and may be implemented using wire or cable, fiber optics, a phone line, a cellular phone link, a radio frequency link, and/or other communication channels. It should be noted that program storage devices, as may be used to describe storage devices containing executable computer code for operating various methods of the present invention, shall not be construed to cover transitory subject matter, such as carrier waves or signals. Program storage devices and computer readable medium are terms used generally to refer to media such as main memory, secondary memory, removable storage disks, hard disk drives, and other tangible storage devices or components.

The term "computer readable medium" is used generally to refer to media such as main memory, secondary memory, removable storage, hard disks, flash memory, disk drive memory, CD-ROM and other forms of persistent memory. It should be noted that program storage devices, as may be used to describe storage devices containing executable computer code for operating various methods of the present invention, shall not be construed to cover transitory subject matter, such as carrier waves or signals. Program storage devices and computer readable medium are terms used generally to refer to media such as main memory, secondary memory, removable storage disks, hard disk drives, and other tangible storage devices or components.

Although only a few embodiments of the invention have been described in detail, it should be appreciated that the invention may be implemented in many other forms without departing from the spirit or scope of the invention. Therefore, the present embodiments should be considered illustrative and not restrictive and the invention is not to be limited to the details given herein, but may be modified within the scope and equivalents of the appended claims.

What is claimed is:

1. A method for operating a telephony server in a home network, the method comprising:

receiving, at the telephony server, a first registration action from a first telephony control point in the home network, wherein the first registration action includes an identification of a first user within the first telephony control point;

supplying, from the telephony server, a first authentication identifier to the first telephony control point, wherein the first authentication identifier is bound to both the first telephony control point and the first user;

receiving, at the telephony server, a second registration action from the first telephony control point, wherein the second registration action includes an identification of a second user within the first telephony control point;

supplying, from the telephony server, a second authentication identifier to the first telephony control point, wherein the second authentication identifier is bound to both the first telephony control point and the second user;

initiating a telephony action at the telephony server, wherein the telephony action involves either the first user or the second user;

determining, at the telephony server, which user the telephony action involves;

sending, from the telephony server, a notification to the user which the telephony action involves;

receiving, at the telephony server, an invoked action granting the telephony action from the first telephony control point, wherein the invoked action includes an authentication identifier;

determining, at the telephony server, whether the authentication identifier received in the invoked action matches the authentication identifier bound to the user which the telephony action involves; and executing the telephony action at the telephony server if the authentication identifier received in the invoked action matches the authentication identifier bound to the user which the telephony action involves.

2. The method of claim 1, wherein the telephony action is the answering of an incoming phone call.

3. The method of claim 1, wherein the telephony action is a request for presence information.

4. The method of claim 1, wherein the telephony action is the playing of a recorded voice mail.

5. The method of claim 1, further comprising:

accessing a policy corresponding to the user which the telephony action involves; and wherein the sending a notification includes only sending types of information identified as permissible according to the policy.

6. The method of claim 5, wherein the policy indicates that only the name of the user which the telephony action involves and the type of telephony action are contained in the notification.

7. The method of claim 5, wherein the policy indicates that the name of the user which the telephony action involves, an identification of a caller, and the type of telephony action are contained in the notification.

8. A method for operating a telephony control point in a home network, the method comprising:
registering a user of the telephony control point with a telephony server by sending, from the telephony control point, a registration action including an identification of the user to the telephony server;
receiving, at the telephony control point, an authentication identifier corresponding to the user from the telephony server in response to the registration action;
storing, at the telephony control point, the authentication identifier in a mapping between users of the telephony control point and authentication identifiers corresponding to said users;
receiving, at the telephony control point, a notification of a telephony event from the telephony server, wherein the notification includes an identification of a user of the telephony control point to which the telephony event pertains;
retrieving, at the telephony control point, an authentication identifier corresponding to the user to which the telephony event pertains from the stored mapping; and
invoking an action on the telephony server to execute the telephony event by sending, from the telephony control point, an invoked action granting the telephony action to the telephony server, wherein the invoked action includes the authentication identifier corresponding to the user to which the telephony event pertains retrieved from the stored mapping.

9. The method of claim 8, further comprising:
registering the user with a second telephony server by sending a registration action including an identification of the user to the second telephony server;
receiving an authentication identifier from the second telephony server; and
storing the authentication identifier from the second telephony server in the mapping.

10. A telephony server operating in a home network, comprising:
means for receiving, at the telephony, server, a first registration action from a first telephony control point in the home network, wherein the first registration action includes an identification of a first user within the first telephony control point;
means for supplying, from the telephony server, a first authentication identifier to the first telephony control point, wherein the first authentication identifier is bound to both the first telephony control point and the first user;
means for receiving, at the telephony server, a second registration action from the first telephony control point, wherein the second registration action includes an identification of a second user within the first telephony control point;
means for supplying, from the telephony server, a second authentication identifier to the first telephony control point, wherein the second authentication identifier is bound to both the first telephony control point and the second user;
means for initiating a telephony action at the telephony server, wherein the telephony action involves either the first user or the second user;
means for determining, at the telephony server, which user the telephony action involves;
means for sending, from the telephony server, a notification to the user which the telephony action involves;
means for receiving, at the telephony server, an invoked action granting the telephony action from the first telephony control point, wherein the invoked action includes an authentication identifier;
means for determining, at the telephony server, whether the authentication identifier received in the invoked action matches the authentication identifier bound to the user which the telephony action involves; and
means for executing the telephony action at the telephony server if the authentication identifier received in the invoked action matches the authentication identifier bound to the user which the telephony action involves.

11. The telephony server of claim 10, further comprising a presence server.

12. The telephony server of claim 10, wherein the telephony server corresponds to a single phone number.

13. A home network system comprising:
one or more telephony control points;
a first telephony server; and
a second telephony server;
wherein each of the one or more telephony control points is configured to register each user of said telephony control point with one or more of the telephony servers, and wherein at least one of the telephony control points registers at least one user with both the first telephony server and the second telephony server; and
wherein each telephony server is configured to:
in response to a registration from a particular telephony control point for a particular user, generate and send an authentication identifier corresponding to the particular telephony control point and the particular user to the particular telephony control point; and
receive an invocation of an action from the particular telephony control point for the particular user, wherein said telephony server only executes the action if an authentication identifier included in the invocation of the action matches the authentication identifier sent in response to the registration from the particular telephony control point for the particular user.

14. The home network system of claim 13, wherein the first telephony server corresponds to a private phone number and the second telephony server corresponds to a public phone number.

15. The home network system of claim 14, wherein the first and second telephony servers are configured to send a notification of a telephony event to one or more of the telephony control points, wherein the notification sent by the first telephony server contains more information regarding the telephony event than the notification sent by the second telephony event.

16. The home network system of claim 13, wherein the registration by each of the one of more telephony control points and the sending of an authentication identifier is performed using a secure session.

17. The home network system of claim 15, wherein the telephony event is received from a wide area network.

18. A non-transitory program storage device readable by a machine tangibly embodying a program of instructions executable by the machine to perform a method for operating a telephony server in a home network, the method comprising:

receiving, at the telephony server, a first registration action from a first telephony control point in the home network, wherein the first registration action includes an identification of a first user within a first telephony control point;

supplying, from the telephony server, a first authentication identifier to the first telephony control point, wherein the first authentication identifier is bound to both the first telephony control point and the first user;

receiving, at the telephony, server, a second registration action from the first telephony control point, wherein the second registration action includes an identification of a second user within the first telephony control point;

supplying, from the telephony server, a second authentication identifier to the first telephony control point, wherein the second authentication identifier is bound to both the first telephony control point and the second user;

initiating a telephony action at the telephony server, wherein the telephony action involves either the first user or the second user;

determining, at the telephony server, which user the telephony action involves;

sending, from the telephony server, a notification to the user which the telephony action involves;

receiving, at the telephony server, an invoked action granting the telephony action from the first telephony control point, wherein the invoked action includes an authentication identifier;

determining, at the telephony server, whether the authentication identifier received in the invoked action matches the authentication identifier bound to the user which the telephony action involves; and executing the telephony action at the telephony server if the authentication identifier received in the invoked action matches the authentication identifier bound to the user which the telephony action involves.

19. The non-transitory program storage device of claim 18, wherein the first and second telephony control points are operated in accordance with the Universal Plug and Play (UPnP) protocol.

20. The non-transitory program storage device of claim 18, wherein the first telephony control point is a television.

* * * * *